United States Patent
Duan (10) Patent No.: US 7,715,871 B2
(45) Date of Patent: May 11, 2010

(54) METHOD AND APPARATUS FOR REPEATING WIRELESS SIGNALS BIDIRECTIONALLY AND SYNCHRONOUSLY

(75) Inventor: Tao Duan, Beijing (CN)

(73) Assignee: Da Tang Mobile Communication Co., Ltd., Beijing (CN)

( * ) Notice: Subject to any disclaimer, the term of this patent is extended or adjusted under 35 U.S.C. 154(b) by 560 days.

(21) Appl. No.: 10/565,261

(22) PCT Filed: Jul. 19, 2004

(86) PCT No.: PCT/CN2004/000829

§ 371 (c)(1),
(2), (4) Date: Apr. 5, 2007

(87) PCT Pub. No.: WO2005/008919

PCT Pub. Date: Jan. 27, 2005

(65) Prior Publication Data

US 2007/0291668 A1   Dec. 20, 2007

(30) Foreign Application Priority Data

Jul. 18, 2003   (CN)   ................ 03 1 45982

(51) Int. Cl.
*H04M 1/00* (2006.01)
(52) U.S. Cl. ............... 455/553.1; 455/552.1; 455/127.4
(58) Field of Classification Search ............... 455/553.1
See application file for complete search history.

(56) References Cited

U.S. PATENT DOCUMENTS

| | | | | |
|---|---|---|---|---|
| 6,473,601 B1 * | 10/2002 | Oda | ............... | 455/132 |
| 7,349,718 B2 * | 3/2008 | Murakami | ............... | 455/553.1 |
| 7,352,736 B2 * | 4/2008 | Saw | ............... | 370/350 |
| 7,386,328 B2 * | 6/2008 | Umewaka et al. | ............ | 455/574 |
| 2002/0001299 A1 * | 1/2002 | Petch et al. | ................. | 370/350 |
| 2003/0032423 A1 * | 2/2003 | Boros et al. | ................. | 455/423 |
| 2005/0213505 A1 * | 9/2005 | Iochi et al. | ................. | 370/236 |

FOREIGN PATENT DOCUMENTS

| | | |
|---|---|---|
| CN | 1165458 | 11/1997 |
| CN | 1222820 A | 4/1999 |
| CN | 1229545 A | 9/1999 |

(Continued)

*Primary Examiner*—Lester Kincaid
*Assistant Examiner*—Isaak R Jama
(74) *Attorney, Agent, or Firm*—Merchant & Gould P.C.

(57) ABSTRACT

A method and an apparatus for repeating wireless signals bidirectionally and synchronously are provided in the present invention, specially used for repeating wireless signals emitted from the base station and terminal devices bidirectionally and synchronously in the TDD system. Said apparatus comprises: a receiving and transmitting antenna set, a frequency selection and bidirection RF amplication circuit, and a synchronization extraction and control device. Signals emitted from the base station and terminal devices are received and repeated by the receiving and transmitting antenna set. The synchronization control information is extracted from signals emitted from the base station by the synchronization extraction and control device to control the frequency selection and bidirection RF amplication circuit, thereby synchronously repeating signals received bidirectionally. By using the present invention, synchronously repeating signals received bidirectionally can be realized without delaying the time for receiving and transmitting signals, at the same time, a function of monitoring system malfunction can be also provided, thereby ensuring that the system works reliably.

17 Claims, 6 Drawing Sheets

FOREIGN PATENT DOCUMENTS

| | | |
|---|---|---|
| CN | 1466301 | 1/2004 |
| EP | 0 948 221 A2 | 10/1999 |
| JP | 8-251653 | 9/1996 |
| JP | 2002-111571 | 4/2002 |
| WO | 94/01941 | 1/1994 |
| WO | 97/08854 | 3/1997 |

* cited by examiner

Prior Art

METHOD AND APPARATUS FOR REPEATING WIRELESS SIGNALS BIDIRECTIONALLY AND SYNCHRONOUSLY

BACKGROUND OF THE INVENTION

1. Field of the Invention

The present invention relates to the field of wireless communication, more particularly to a method and an apparatus for repeating wireless signals bidirectionnally and synchronously.

2. Description of the Related Art

With the improvement of the communication technology, not only the conventional Frequency Division Duplex (FDD) wireless communication system such as Global System for Mobile communication (GSM), and series standards (IS95) of narrow band CDMA(code division multiple access) system, ect., have developed very rapidly, but also the Time Division Duplex(TDD) wireless communication system are applied more widely because of the flexible frequency allocation without allocating paired frequency and the simple system devices. In the TDD wireless communication system, receiving and transmitting are performed respectively in different time slots in the same frequency channel or carrier wave to ensure that receive and transmit channel or uplink and downlink are seperated by the time difference.

Figure 1:
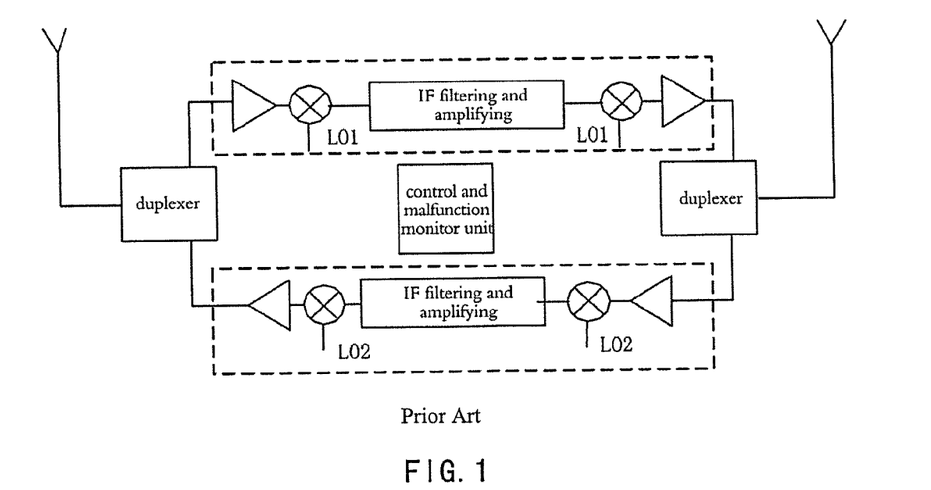
FIG. 1 is a block diagram showing conventional repeater devices in FDD system.

In the FDD system, in order to expand the coverage area and avoid the occurrence of some blind areas in the system, wireless signals emitted from a base station and terminal devices are amplified by repeaters, and then the amplified signals are repeated. Since wireless transmission signals emitted from the base station and terminals are signals having different frequencies in FDD system, filters or duplexers can be used conveniently for repeaters to realize the separation between signals emitted from the base station and terminals, so that the bidirectional repeat can be realized. A block diagram of a repeater in conventional FDD system is shown in FIG. 1. Wireless signals emitted from the base station are emitted to the required coverage area through air after the frequency selection and amplification complete. Similarly, wireless signals emitted from terminals in coverage area are emitted to the base station after the frequency selection and amplification complete. Such bidirectional repeating performed simultaneously realizes the isolation between wireless signals emitted from the base station and terminals according on the frequency difference between signals emitted and received and on the attenuation of different frequency by duplexer, so that repeating wireless signals emitted from the base station and terminal devices bidirectionally and synchronously can be realized without applying sequential control to wireless signals.

In the TDD system, wireless transmission signals from the base station and terminals adopt same frequency and are distinguished only by the different time slot, thus bidirectional and synchronous repeating of these signals can't be realized by using the above repeator applied in the TDD system and must adopt novel design methods and apparatuses.

Method and apparatus for increasing the transmission distance of wireless communication devices are disclosed in Chinese Patent Application No. 98126224.4, wherein the apparatus comprises two diveces: the second one is used to generate clock signals at two operating rates for circuits used in frame synchronization of wireless interface, one of said two operating rates being lower than reference frequency and the other being higher, so that switching data in the TDD mode can be realized by means of adjusting time quantum of receive, storage and transmit. However, interferences with other users can occurr in the multiuser system by means of adjusting time quantum of receive storage and transmit. Also, a TDD repeater for CDMA is disclosed in another Chinese Patent Application No. 96196621.1, wherein, the TDD repeater receives the spread spectrum signals discontinuously, amplifies these signals and repeats the data in preceeding time slot until the following time slot by delaying them for a predetermined amount. The method intends to repeat data in this time slot until the next time slot by delaying signals greatly. When the switching intreval between receiving and transmitting signals is relatively longer, larger delays are needed, and it is difficult to utilize Surface Acoustic Wave (SAW) filter and results in the occurence of certain errors in fixed delays. At the same time, the inconsistency of the wireless resource between the allocated and the applied actually will occur.

During implementing repeating signals bidirectionally and synchronously, inferences, delay errors, etc., may occurred when using the above technologies. Therefore, the prior art can not satisfy the demands of repeating signals bidirecitonally and synchronously and results in difficulties in increasing coverage area and preventing occurrence of coverage blind areas in the TDD system.

SUMMARY OF THE INVENTION

In view of this, it is an object of the present invention to provide a method and an apparatus for repeating wireless signals bidirectionally and synchronously, specifically used for repeatting wireless signals emitted from a base station and terminals bidirectionnally and synchronously in the TDD system to ensure the reliabile signals receiving in multiusers system, prevent interference and delay errors, enhance the quality of wireless signals and expand the coverage area of wireless signals.

The present invention provides a method for repeating wireless signals bidirectionally and synchronously in the TDD wireless communication system comprising a base station and a terminal device. The method comprises:

step A: obtaining synchronization information of said system from wireless signals emitted from said base station;

step B: generating reference control signals accurately synchronized with the base station according to the obtained system synchronization information and the system time slot configuration information;

step C: processing said reference control signals accurately synchronized with the base station respectively to generate a plurality of time sequential control signals to controll the uplink RF(radio frequency) amplification, the downlink RF amplification and the receiving and transmission respectively, thereby controlling the downlink channel to be closed when the uplink channel is open and vice versa, so as to repeat signals emitted from uplink/downlink channel between said base station and terminal devices bidirecitonnally and synchronously. In step B, the generation of reference control signals accurately synchronized with the base station according to the system synchronization information comprises:

step B1: generating a synchronization pulse and activating a timer when obtaining the system synchronization information;

step B2: the timer activated in step B1 beginning to time according to the system time slot configuraiont information, switching the uplink and downlink enable signals on the basis of the timing of the timer, thereby generating reference control signals accurately synchronized with the base station.

Between step B1 and B2, said method further comprises: obtaining the adjustable timing for synchronization from the base station, and calculating the lag timing between the synchronization pulses generated in step B1 and the synchronization time slot including the synchronization information corresponding to said pulse.

The timer of this method carries out the timing according to the lag timing, the total time of uplink/downlink time slot and the time of the guard time slot $G_{T0}/G_{T1}$ in the time solt configuration, and allows the accurate synchronous reference control signals to switch the uplink and downlink enable signals after the last transmission data bit in the uplink/downlink time slot.

The initial timing of the timer is: the total time of the uplink time slot+the time of the guard time slot $G_{T0}$–(the lag timing– the time of the synchronization time slot). A downlink enable signal is generated after the initial timing is carried out, and the timer begins to time a downlink enable signal: the time of the guard time slot $G_{T1}$+the total time of the downlink time slot. The uplink enable signal is generated after the timing is carried out, and the timer begins to time an uplink enable signal: the time of the guard time slot $G_{T0}$+the total time of the uplink time slot. After the timing of the uplink enable signal is carried out, the downlink enable signal is generated again. The timer repeats the above operation to time the uplink and downlink enable signals, and the uplink enable signals and downlink enable signals are generated repeatedly according to these timings, thereby generating said reference control signals accurately synchronized with the base station.

Said method further comprises: synchronizing the timer one time using the synchronization pulses after a predetermined period to eliminate the accumulated errors of the timer clock.

The sequential control signals mentioned in step C are obtained by logically converting and delaying reference control signals accurately synchronized with the base station.

Said logically converting and delays mean: delaying the downlink RF amplification control signals, the uplink RF amplification control signals and the receive and transmit control signals respectively, so that: when switching from the downlink enable to the uplink enable, the downlink RF amplification control signal is firstly switched into inactive state, then the receive and transmit control signal is switched to allow the uplink channel to be open, and the uplink RF amplification control signal is finally switched into an active state; when switching the uplink enable from to the downlink enable, the uplink RF amplification control signal is firstly switched into inactive state, then the receive and transmit control signal is switched to allow the downlink channel open, and the downlink RF amplification control signal is finally switched into an active state.

Said active states of the uplink and downlink RF amplification control signals are indicated by a high level, and said inactive states by a low level.

In step C, said control which closes the downlink channel when the uplink channel is open performs as followings: firstly, the downlink RF amplification control signal switched into the inactive state allows the downlink of power amplification to be closed, then the uplink channel is opened and the downlink channel is closed by the receive and transmit control signal, and at last the uplink RF amplification control signal switched into the active state enables the uplink of the power amplification; and said control which closes the uplink channel when the downlink channel is open is performed as followings: firstly, the uplink RF amplification control signal which is switched into inactive state allows the uplink of the power amplification to be closed, then the downlink channel is opened and the uplink channel is closed by the receive and transmit control signal, and at last the downlink RF amplification control signal switched into active state enables the downlink of power amplification.

The present invention also provides an apparatus for repeating wireless signals bidirectionally and synchronously, comprising a receiving antenna for base station signals, a receiving antenna for terminal device signals, a frequency selection and bidirection RF amplification circuit, and a synchronization extraction and control device.

The synchronization extraction and control device receives wireless signals emitted from the base station by the receiving antenna for base station signals, generates sequential control signals by using these wireless signals and the system time slot configuration information, and transmits the sequential control signals to the frequency selection and bidirection RF amplification circuit.

The frequency selection and bidirection RF amplification circuit receives wireless signals emitted from the base station by the receiving antenna for base station signals, opens the downlink channel channel while closing the uplink channel, amplifies and filters these wireless signals according to the sequential control signals transmitted from the synchronization extraction and control device, then repeats the amplified wireless signals to terminal devices by the receiving antenna for terminal devices signals; and receives wireless signals emitted from terminal devices by the receiving antenna for terminal device signals, opens the uplink channel while closing the downlink channel, amplifies and filters these wireless signals according to the sequential control signals transmitted from the synchronization extraction and control device, then repeats the amplified wireless signals to the base station by the receiving antenna for base station signals.

Said frequency selection and bidirection RF amplification circuit comprises:

a filter set for filtering wireless signals which are received and repeated by receiving and transmitting antennas and emitted from terminal devices and the base station so as to obtain RF signals in the desired band and eliminate interfering signals from out bands, a receive and transmit switch set for controlling receiving and/or transmitting the obtained RF signals in the desired band;

a power amplification device for amplifying the obtained RF signals in the desired band to reach a power which is required when these signals are revevied and transmitted.

Said frequency selection and bidirection RF amplification circuit comprises: a first filter, a second filter, a first receive and transmit switch, a second receive and transmit switch, a power amplification device for uplink signals, and a power amplification device for downlink signals, said the first and the second receive and transmit switches being used for opening the uplink channel and closing the downlink channel or for opening the downlink channel and closing uplink channel under the control of the sequential control signals. When the uplink channel is opened, the uplink power amplification device and the downlink power amplification device are in on state and in off state respectively under the control of the sequential control signals; and when the downlink channel is opened, the uplink power amplification device and the downlink power amplification device is in off state and in on state respectively under the control of the sequential control signals, wherein, for the uplink channel:

a wireless signal emitted from terminal devices is received by the receiving antenna for terminal device signals and is filtered by the second filter, then transmitted to the power amplification device downlink signals through the second receive and transmit switch and amplified; the amplified wireless signal is transmitted to the first filter for filtering through the first receive and transmit switch; and the first filter transmits the amplified wireless signal after being filtered to the base station by means of the receiving antenna for base station signals; and for the downlink channel:

the wireless signal emitted from the base station is received by the receiving antenna for base station signals and is filtered by the first filter, then transmitted to the power amplification device uplink through the first receive and transmit switch and amplified. The amplified wireless signal is transmitted to the second filter for filtering through the second receive and transmit switch, and the second filter transmits the amplified wireless signal after being filtered to terminal device by means of the receiving antenna for terminal device signals.

Said power amplification device comprises a power amplifier and a variable gain regulator for regulating the output signal level of the power amplifier to controll amplification factor of amplification devices.

Said downlink power amplification device mentioned above comprises: a first to fourth power amplifier, a first converter, a second converter, a first SAW filter and a first variable gain regulator. The signal emitted from the base station is transmitted to the input terminal of the first power amplifier through the first receive and transmit switch, then amplified by the first power amplifier, and next down-converted to IF (intermediate frequency) signals by the first converter. After being amplified by the second amplifier, IF filtered in the first SAW filter, level-regulated by the first variable gain regulator, amplified by the third amplifier, up-converted to RF signals by the second converter, and amplified by the fourth amplifier in turn, the signal emitted from this base station reaches a predetermined level and then is transmitted through the second receive and transmit switch.

The above said uplink power amplification device comprises: a fifth to eighth power amplifier, a third converter, a fourth converter, a second SAW filter, and a second variable gain regulator. The signal emitted from the terminal devices is transmitted to the input terminal of the fifth power amplifier through the second receive and transmit switch, then amplified by the power amplifier, and next down-converted to IF signals by the third converter. After being amplified by the sixth amplifier, IF filtered in the second SAW filter, level-regulated by the second variable gain regulator, amplified by the seventh amplifier, up-converted to RF signals by the fourth converter and amplified by the eighth amplifier, the signal emitted from the terminal devices reaches a predetermined level and then is transmitted through the first receive and transmit switch.

Said variable gain regulator can be an adjustable attenuator or a variable gain amplifier.

Said synchronization extraction and control device comprises: a wireless transceiver for receiving wireless signals emmited from the the base station and emitting wireless signals to the base station; a synchronization extraction device for extracting the system synchronization information from wireless signals emitted from the base station; and a sequential control device for generating the control sequence corresponding to signals emitted from the base station and terminal devices based on the system synchronization information to control the frequency selection and bidirection RF amplification circuit.

Said sequential control device is further used for monitoring the frequency selection and bidirection RF amplification circuit and emitting malfunction monitoring signals to the base station by means of the wirelesss transceiver.

Said receiving antenna for base station signals comprises: a first receiving antenna for base station signals for receiving wireless signals emitted from the base station and transmitting these wireless signals to the frequency selection and bidirection RF amplification circuit, and further repeating wireless signals emitted from terminal device to the base station; a second receiving antenna for base station signals for receiving wireless signals emitted from the base station and transmitting these wireless signals to the synchronization extraction and control device.

Said receiving antenna for base station signals further comprises a third receiving antenna for base station signals for receiving wireless signals emitted from the base station, and a coupler by which wireless signals are sent to the frequency selection and bidirection RF amplification circuit and the synchronization extraction and control device respectively.

Said receiving antenna for base station wireless signals and the receiving antenna for terminal devices wireless signals form a receiving and transmitting antenna set.

On the basis of the existing devices, the present invention can implement to repeat wireless signals emitted from the base station and terminal device bidirecitonally and synchroniously by generating a certain circuit control sequence synchronized with the base station in the system to control the bidirectional amplifier without delaying receiving and transmit signals according to system arrangement of the uplink and downlink time slot by extracting synchronization information of the TDD system. Also, the present invention provides a function of monitoring operating circuit, which can report operating mode of devices to maintenance center, to ensure that devices work reliably.

DETAILED DESCRIPTION OF THE PRESENTLY PREFERRED EMBODIMENTS

For a better understanding of the present invention, further detail descriptions will be made with reference to accompanying drawings and embodiment modes.

Figure 2:
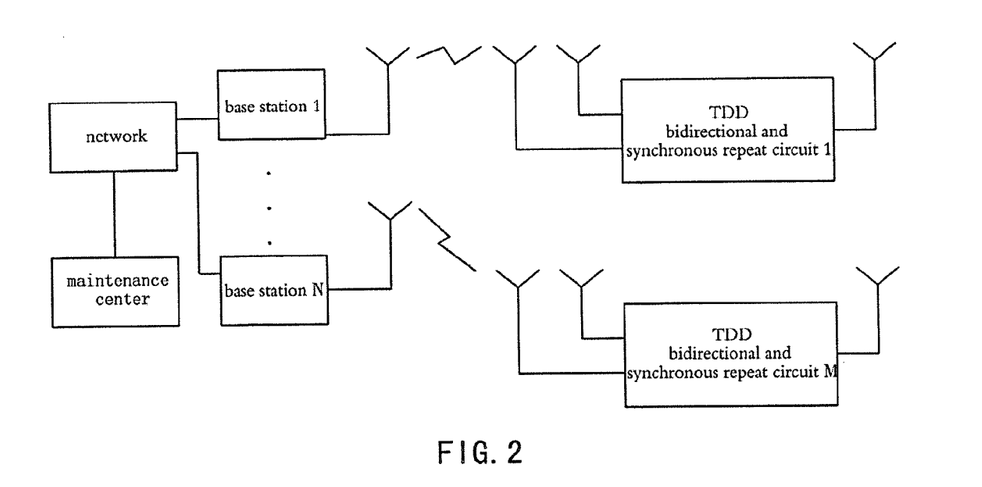
FIG. 2 is a sketch drawing showing a network of a base station in the system and apparatus for repeating wireless signals bidirectionnally and synchronously according to the present invention.

FIG. 2 shows a network of a base station in the system and apparatus for repeating wireless signals bidirectionnally and synchronously according to the present invention. In a wireless communication network, normally a network maintenance center maintains the normal operation of a plurality of base stations, each of which corresponds to a plurality of apparatus for repeating wireless signals bidirectionnally and synchronously according to the present invention, so as to improve qualities and coverage areas of signals emitting to various directions from base stations by repeating wireless signals emitted from the base station and terminals bidirectionnally and synchronously by this apparatus, and each apparatus of the present invention corresponds to a fixed base station and a plurality of terminal devices Hereinafter, the present invention will be described with detailed embodiments.

Figure 3:
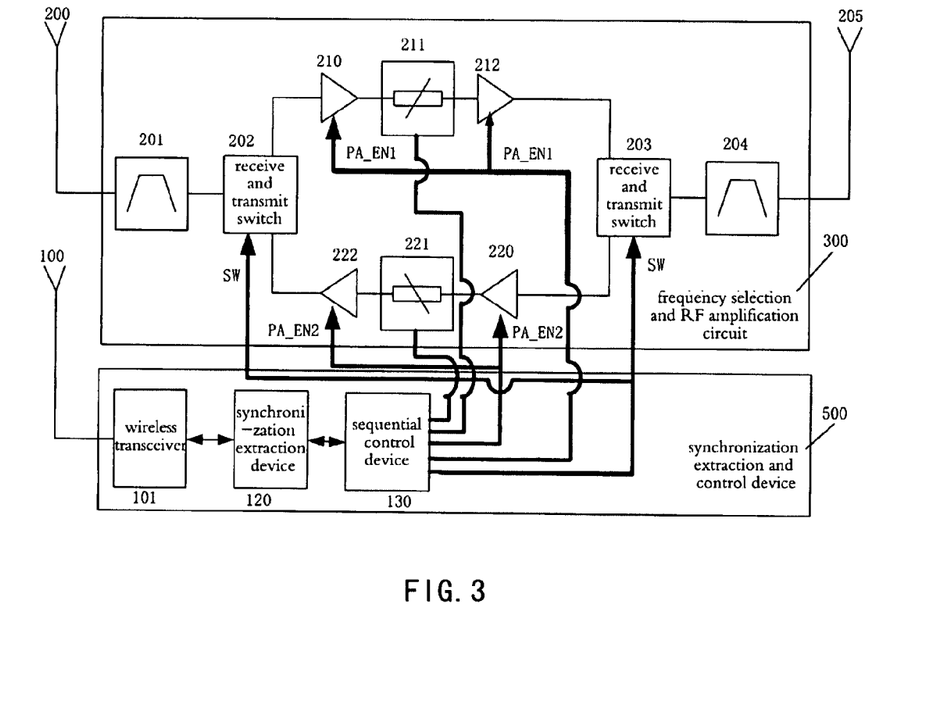
FIG. 3 is a block diagram showing a first embodiment of the apparatus for repeating wireless signals bidirectionnally and synchronously according to the invention.

FIG. 3 shows a first embodiment of the apparatus for repeating wireless signals bidirecitonally and synchronously according to the invention. Said apparatus comprises at least a frequency selection and bidirection frequency circuit 300, a synchronization extraction and control device 500 and antennas 200, 100 and 205 for receiving/transmitting wireless signals. The synchronization extraction and control device 500 and the frequency selection and bidirection RF amplification circuit 300 use different antennas and base stations as air-link, respectively.

The receiving antenna 100 for base station signals is connected with the synchronization extraction and control device 500 to receive signals emitted from the base station and transmit these wireless signals to the synchronization extraction and control device 500; the receiving antenna 200 for base station signals is connected with the frequency selection and bidirection RF amplification circuit 300 to receive signals emitted from the base station, transmit these wireless signals to the frequency selection and bidirection RF amplification circuit 300 and repeat wireless signals emitted from terminal device and processed by the frequency selection and bidirection RF amplification circuit 300 to the base station; the receiving antenna 205 for terminal device signals is connected with the frequency selection and the bidirection RF amplification circuit 300 to receive signals emitted from terminal devices, transmit these wireless signals to the frequency selection and bidirection RF amplification circuit 300 and repeat wireless signals emitted from the base station and processed by the frequency selection and bidirection RF amplification circuit 300 to terminal devices.

In this embodiment of the present invention, the receiving antenna 100 for base station signals, the receiving antenna 200 for base station signals and the receiving antenna 205 for terminal device signals are integrated into a receiving and transmitting antenna set in this apparatus. In other embodiments of the present invention, each antenna described above can be set individually, which will not affect the implementation of the invention. Directional antennas can be used as the antenna 100 and the antenna 200, by which the apparatus only communicates with and repeats to the specified base station. The antenna 205 is used to cover the predeminated area, and omni antennas or directional antennas can be used as the antenna 205 depending on the requried coverage area Hereinafter, the frequency selection and bidirection RF amplification circuit and the synchronization extraction and control device of the present invention will be described in detail.

The frequency selection and bidirection RF amplification circuit comprises a filter set, a receive and transmit switch set, and a power amplification device, wherein, the filter is used to prevent out-of-bands signals of other systems from entering the frequency selection and bidirection RF amplification circuit, and prevent other signals from being emitted except the amplified signals generated by the frequency selection and bidirection RF amplification circuit so as to prevent from interfering with other system. In this embodiment, the band pass filter 201 and 204 are integrated into a filter set; the receive and transmit switch 202 and 203 are integrated into a receive and transmit switch set; two stage amplifiers 210 and 212, the variable gain regulator 211, two stage amplifiers 220 and 222, and the variable gain regulator 221 are integrated into a power amplification device, wherein, the variable gain regulator 211 is coupled to amplifiers 210 and 212 respectively and amplifies the received signals emitted from the base station to reach a requried power used for repeating these signals together with amplifiers 210 and 212; the variable gain regulator 221 is coupled to amplifiers 220 and 222 respectively and amplifies the received signals emitted from terminal devices to reach a required power used for repeating these signals together with amplifiers 220 and 222. Said variable gain regulators are used for regulating magnification factor, but it can be eliminated in other embodiment of the present invention if the magnification factor is a constant, and this will not affect the implementation of the invention.

Figure 6:
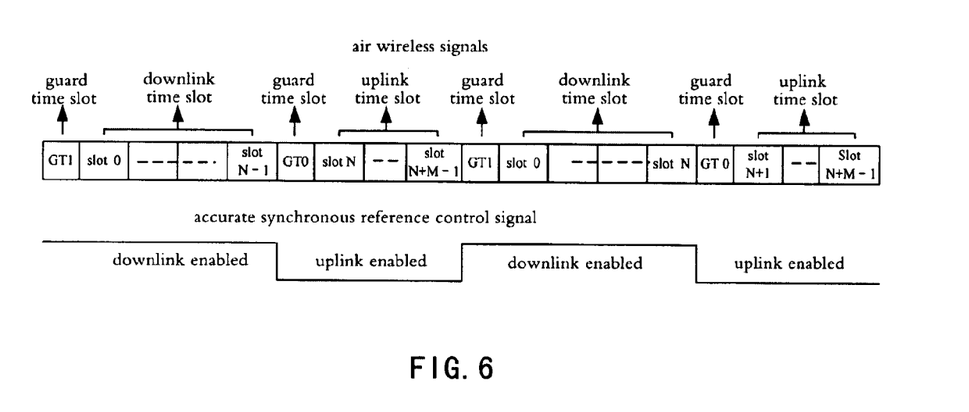
FIG. 6 is a sketch drawing showing an accurate synchronous reference control signal which is generated by a synchronization extraction and control device and corresponds to wireless signals emitted from the base station.

The synchronization extraction and control device 500 comprises a wireless transceiver 101, a synchronization extraction device 120 and a sequential control device 130, wherein, the wireless transceiver 101 and the synchronization extraction device 120 receive air wireless signals from the base station to obtain the system synchronization information according to the synchoronous algorithm selected by the system, and regenerate a synchronization pulse as a preliminary synchronous control sequence based on the obtained synchronization information, and then the synchronization extraction and control device 500 sends a access request to the base station, and establishes links with the base station to access the maintenance center and obtain parameter configuration information including the system time slot configuration information. Said parameter configuration information can be set in advance, and stored in the apparatus for being invoked directly when necessary, which will not affect the implementation of the invention. During accessing the maintenance center, the synchronization extraction and control device 500 completes the accurate synchronization with the base station based on adjustment instruction by using this parameter configuration information, and generates accurate synchronous reference control signals which can switch the uplink enable signals and the downlink enable signals as shown in FIG. 6. And then by using this accurate synchronous reference signals, the synchronization extraction and control device 500 generates a plurality of sequential control signals to control the opening and closing of uplink/downlink channels in the frequency selection and bidirection RF circuit 300, thereby controlling the sequence of the frequency selection and bidirection RF circuit 300 and realizing repeatting wireless signals emitting from the base station and terminal devices bidirectionally and synchronously in accordance with said control.

Hereinafter, the operational process of the synchronization extraction and control device 500 will be described in detail.

In the TDD system, specific information is transmitted as the synchronization information of terminal devices and the base station in specific time slot. The synchronization information is generally in the first time slot in the uplink or in the last time slot in the uplink. The time slot having the synchronization information can be similar to the time slot of general service or be a totally special one, and the interval can also be specified. In other embodiments of the present invention, the synchronization information can be in any time slot in the downlink, but the hypothesis is that the location thereof must be known by the system and must be fixed. The synchronization extraction and control device 500 generates synchronization pulses according to the position of the time slot including the synchronization information.

After obtaining the synchronization information, the synchronization extraction and control device 500 generates a synchronization pulse, then begins to access the base station to implement synchronization adjustment using the system time slot configuration information, and calculates the lag time T0 between synchronization pulses generated in the local and synchronization time slot via the adjustable timing of synchronization returned from the base station. Said system time slot configuration is used to determine the allocation of the number of the uplink and downlink time slot and controll the time of uplink and downlink enables. The following is a description of the relative time slot of the invention.

In the TDD system, the downlink time slots have N time slots marked from zero to N−1, the uplink time slots have M time slots marked from N to N+M−1, where M and N are positive integer and greater than one, and the guard time slot $G_{T0}$ and $G_{T1}$ are also included. During the guard time slot $G_{T0}$ and $G_{T1}$, the system doesn't transmit information, the devices switch their inner states and the time slots $G_{T0}$ and $G_{T1}$ can be a part of the uplink or downlink time slot and are timed by a timer. The cycle of a wireless frame is T, the interval of the guard time slot $G_{T0}$ is $T_{GT0}$, the interval of the guard time slot $G_{T1}$ is $T_{GT1}$, the total interval of all downlink time slots is Tdown, and the total interval of all uplink time slots is Tup, and the interval of each time slot is $T_X$(X=0, . . . , N+M), wherein, N indicates the number of the downlink time slots and M indicates the number of the uplink time slots. The above information is the system time slot configuration information and is the known system parameter.

Figure 7:
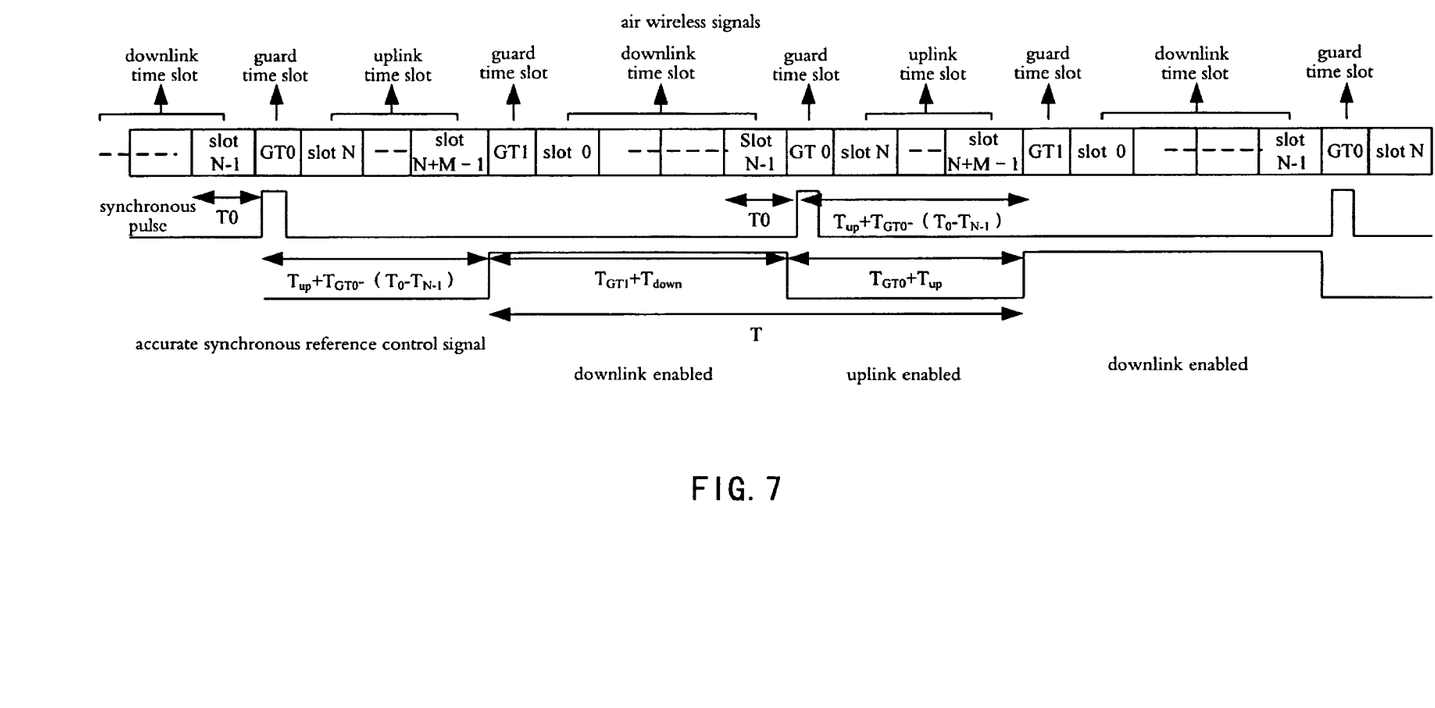
FIG. 7 is a sketch drawing showing controlling and adjusting the accurate synchronous reference control signal as shown in FIG. 6 by a synchronization pulse generated from the synchronization information of the base station.

As shown in FIG. 7, suppose that the synchronization information is in the last time solt "slotN−1" in downlink signals, the synchronization extraction and control device 500 generates synchronization pulses while activating another timer to provide accurate synchronous reference control signals. The first timing is $T_{up}+T_{GT0}-(T_0-T_{N-1})$, then the synchronization extraction and control device 500 generates a downlink enable signal, and then generates an uplink enable signal after another interval of $T_{G1}+T_{down}$, and after this, and again a downlink enable signal is generated after a further interval of $T_{GT0}+T_{up}$, thus an accurate synchronous reference signal is generated. Another timer generating accurate synchronous reference control signals will be synchronized by using synchronization pulses to eliminate the accumulated errors of the local clock after a specified time as shown in FIG. 7, thereafter the local information including devices information, the setting of operation parameters and the working state information of various components of these devices are uploaded to the maintenance center.

In FIG. 6 and FIG. 7, there are periodic changes of two states of the uplink enable and the downlink enable in the accurate synchronous reference control signals generated in the above mentioned manners. The falling edge of the accurate synchronous reference control signals is synchronized with the last transmission data bit in the last time slot in the downlink time slot of air wireless signals, i.e., the state of the reference control signals changes, e.g., from a high level to a low level after the last transmission data bit. The rising edge of the accurate synchronous reference control signals is synchronized with the last transmission data bit in the last time slot of the uplink time slot of air wireless signals, i.e., the state of the reference control signals changes, e.g., from a low level to a high level after the last transmission data bit.

Figure 4:
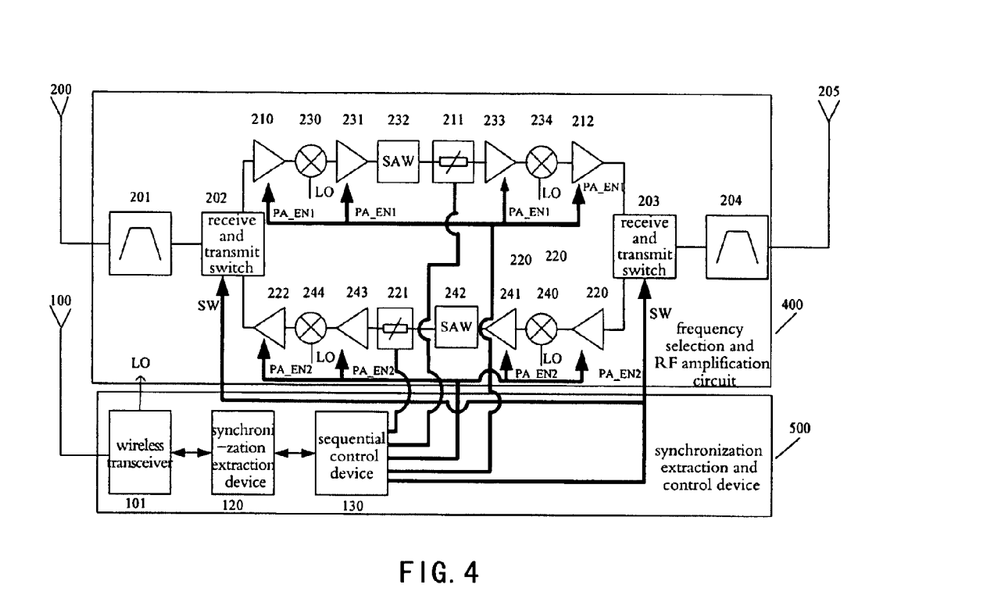
FIG. 4 is a block diagram showing a second embodiment of the apparatus for repeating wireless signals bidirectionnally and synchronously according to the invention.
Figure 8:
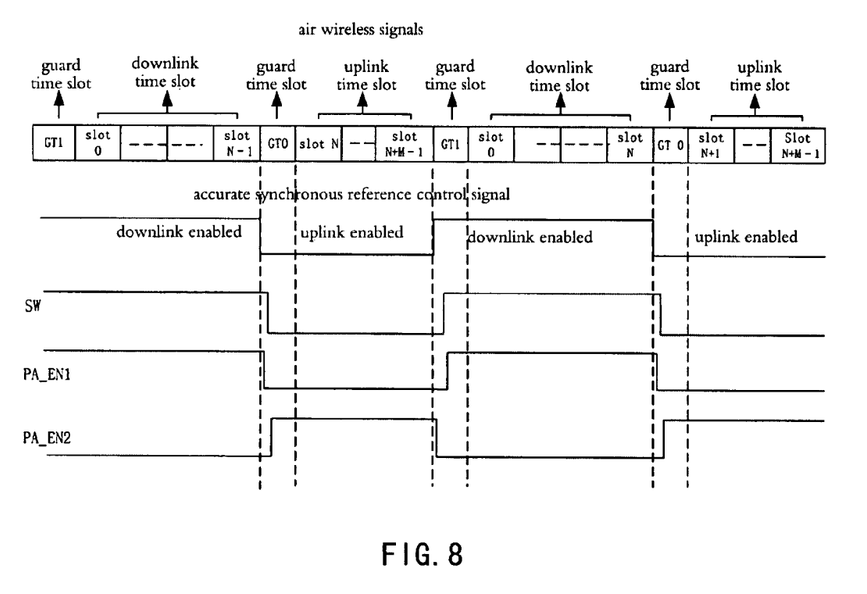
FIG. 8 shows corresponding relation between the time sequence of the accurate synchronous reference control signals as shown in FIG. 7 and the control signals in a bidirectional and synchronous repeat control link.

After the synchronous adjustment with the system completes, which ensures the accurate synchronization of control sequence with the receive and transmit time slot of the base station, the sequential control device 130 sets the gain of vaiable gain regulators 211 and 221 by the connection of the control bus as shown in FIG. 3 and FIG. 4 according to the system requirements and then according to the generated accurate synchronous reference control signals, generates predetermined sequential control signals PA_EN1, PA_EN2 and SW through certain logical conversion, by which the states of the adopted receive and transmit switch and power amplifier are controlled. In FIG. 8, PA_EN1 is the uplink RF amplification control signal, PA_EN2 is the downlink RF amplification control signal and SW is the receive and transmit control signal. The conversion of the downlink signals PA_EN1, PA_EN2 and SW must be finished in the guard time slot $G_{T0}$ and $G_{T1}$ defined by the system. At the interval of $G_{T0}$, PA_EN1 changes from a high level to a low level and SW also changes from a high level to a low level after a certain delay. After a further delay, PA_EN2 changes from a low level to a high level. At the interval of $G_{T1}$, PA_EN2 changes from a high level to a low level and SW also changes from a low level to a high level after a certain delay. After a further delay, PA_EN1 changes from a low level to a high level. PA_EN1, PA_EN2 and SW are generated by a certain logical conversion and delay circuit based on accurate synchronous reference control signals, and the skilled in the art can achieve this time sequence by logical circuit or other circuits according to this time charity, thereby detail descriptions will not be made here. Wherein, PA_EN1 represents a sequential control signal of the downlink of power amplification, and also referred as the control signal of the downlink RF amplification. If PA_EN1 is a high level, it means that the power amplifiers 210 and 212 and the variable gain regulator 211 in the corresponding controlled downlink of power amplification turn on; if PA_EN1 is a low level, it means that the power amplifiers 210 and 212 and the variable gain regulator 211 in the corresponding controlled downlink of power amplification turn off. PA_EN2 represents a sequential control signal of the uplink of the power amplification, and also referred as the control signal of the uplink RF amplification. If PA_EN2 is a high level, it means that the power amplifiers 220 and 222 and the variable gain regulator 221 in the corresponding controlled uplink of power amplification turn on; if PA_EN2 is a low level, it means that power amplifiers 220 and 222 and the variable gain regulator 221 in the corresponding controlled uplink of power amplification turn off. SW represents a sequential control signal of receive and transmit switch set. When SW is a high level, the downlink for emitting is switched on by the receive and transmit switches 202 and 203, meanwhile the uplink for emitting is switched off; when SW is a low level, the downlink for emitting is swithched off by the receive and transmit switches 202 and 203, meanwhile the uplink for emitting is switched on.

Said sequential control device 130 can further perform the function of the malfunction monitoring, and the malfunctions to be monitored comprise: voltage, current, standing wave ratio detection, temperature, etc.. But whether the sequential control device 130 having the function of malfunction monitoring or not won't affect the implementation of the present invention.

Here is an introduction of the principle of the fundamental operation of the apparatus of the present invention.

After the apparatus provided by the present invention is powered on to start up, the amplifiers 210 and 212, the variable gain regulator 211, the amplifiers 220 and 222 and the variable gain regulator 221 in the power amplification device are set as the off state by the sequential control device 130. The receive and transmit switch 202 is coupled to the output of the power amplifier 222, and the receive and transmit switch 203 is coupled to the output of the power amplifier 212. The amplifiers 210 and 212, the variable gain regulator 211, the amplifiers 220 and 222 and the variable gain regulator 221 are set to be controlled by the sequential control switch synchronized with the sequential control device 130. The switching of the receive and transmit switches 202 and 203 changes under the control of the operating characteristic of the TDD system, that is, during the downlink time slot, the power amplifier 210 is switched on by the receive and transmit switch 202, the power amplifier 212 is switched on by the receive and transmit switch 203; during the uplink time slot, the power amplifier 220 is switched on by the receive and transmit switch 203, and the power amplifier 222 is switched on by the receive and transmit switch 202. Each of the above amplifiers and variable gain regulators need to be switched on and off rapidly by switches synchronized with the sequential control device 130. The switching off mode can be switching off the power or the bias level of the amplifier and is determined by the operation mode of the selected power amplifier.

In the following, the process of the circuit operation as shown in FIG. 3 will be described in detail.

With regard to repeating the downlink signals emitted from the base station:

When a downlink signals arrives in the directional antenna 200, the operation state of the power amplifiers 220 and 222 and the variable gain regulator 221 have been set as the off state by the synchronization extraction and control device 500 in advance some time so as to disable the uplink of the power amplification under the control of a plurality of equential control signals. After a certain delay, the receive and transmit switch 202 switches to the input terminal of the power amplifier 210 and the receive and transmit switch 203 switches to the output terminal of the power amplifier 212 so as to open the downlink channel and close the uplink channel simultaneously. After a further delay, the states of the power amplifiers 210 and 212 and the variable gain regulator 211 are set as the on state to enable the downlink of power amplification. All state conversions mentioned above are finished in the guard time slot $G_{T1}$. In this manner, the downlink signal is transmitted to the band pass filter 201 from the directional antenna 200, then to the input terminal of power amplifier 210 through the receive and transmit switch 202 and reach a predetermined level after being amplified by the amplifier 210, level-regulated by the variable gain regulator 211 and amplified by the amplifier 212. After that, the amplified uplink signal is transmitted to the directional antenna 205 through the receive and transmit switch 202 and the band pass filter 204, and then emitted to a predetermined area by the directional antenna 205.

During said process of repeating the downlink signal, the uplink of the power amplification is closed first, then the uplink channel is closed after a delay while the downlink channel is opened, and the uplink of the power amplification is enabled after another delay. Thus, possible destroys to devices can be prevented, which may result from the open of the amplification circuit when the conversion between uplink channel and downlink channel is done by the receive and transmit switch.

With regard to repeating the uplink signals emitted from terminals:

When an uplink signal arrives in the directional antenna 205, the operation states of the power amplifiers 210 and 212 and variable gain regulator 211 have been set as the off state by the synchronization extraction and control device 500 in advance some time so as to disable the downlink of power amplification under the control of a plurality of sequential control signals. After a certain delay, the receive and transmit switch 203 switches to the input terminal of the power amplifier 220 and the receive and transmit switch 202 switches to the output terminal of the power amplifier 222 so as to open the uplink channel and close the downlink channel simultaneously. After a further dealy, the states of the power amplifiers 220 and 222 and the variable gain regulator 221 are set as the on state to enable the uplink of the power amplification. All state conversions described above are finished in the guard time slot $G_{T1}$. In this manner, the downlink signal is transmitted to the band pass filter 204 from the directional antenna 205, then to the input terminal of the power amplifier 220 through the receive and transmit switch 203, and reach a predetermined level after being amplified by the amplifier 220, level-regulated by the variable gain regulator 221 and amplified by the amplifier 222. After that, the amplified uplink signal is transmitted to the directional antenna 200 through the receive and transmit switch 202 and the band pass filter 201, and then emitted to a base station receiving antenna by the directional antenna 200.

During said process of repeating the uplink signal, the downlink of power amplification is closed first, and then the downlink channel is closed after a delay while the uplink channel is opened, and the uplink of the power amplification is enabled after another delay. Thus, possible destroys to devices can be prevented, which may result from the open of the amplification circuit when the conversion between uplink channel and downlink channel is done by the receive and transmit switch.

The variable gain regulators 211 and 221 for regulating gains of the amplification links can be an adjustable attenuator, a variable gain amplifier, or any other members if only the gain or attenuation is adjustable and can be determined depending on the system requirements.

In other embodiments of the present invention, the sequential control device 130 further has the function of malfunction monitoring. During a normal operation, the sequential control device having function of malfunction monitoring monitor all circuits and upload the state information to the maintenance center periodically or a periodically by the wireless transceiver 101 according to the requirements of the system.

FIG. 4 shows a second embodiment of apparatus for repeating wireless signals bidirecitonally and synchronously according to the invention. The operational principle of the circuit in this embodiment is similar to that of the first embodiment shown in FIG. 3. The receiving and transmitting antenna set and the synchronization extraction and control device in this apparatus are same as those of the first embodiment shown in FIG. 3, and the difference is that a converter and a Surface Acoustic Wave (SAW) filter are added into the frequency selection and bidirection RF amplication circuit 400. A RF signal received by the antennas being down-converted to a IF signal,and the obtained IF signal is filtered better so as to satisfy more strict requirement of narrowband.

Next, the filtered IF signal is up-converted to a required RF signal by repeating, and then the required RF signal is emitted. Since the operation frequency for receiving is equal to the operation frequency for transmitting in the TDD system, one local frequency is adopted for the local oscillation (LO) of the apparatus.

The following is an operational process of said embodiment.

Similarly, the power amplifiers 210, 231, 233 and 212, the amplifiers 220, 241, 243 and 222, and the variable gain regulators 211 and 221 are set to be controlled by a plurality of sequential control signals generated by the sequential control device 130. At the same time, the felling directions of the receive and transmit switches 202 and 203 are also changed under the control of these sequential control signals.

With regard to repeating the the downlink signals emitted from the base station:

When a downlink signal arrives in the directional antenna 200, the operation states of the power amplifiers 220, 241, 243 and 222 and the variable gain regulator 221 have been set as the off state by the synchronization extraction and control device 500 in advance some time according to plurality of sequential control signals generated by he sequential control device 130 . After a delay, the receive and transmit switch 202 switches to the input terminal of the power amplifier 210 and the receive and transmit switch 203 switches to the output terminal of the power amplifier 212. After a further dealy, the states of the power amplifier 210,231, 233, 212 and the variable gain regulator 211 are set as the on state. All these state conversions are finished in the guard time slot $G_{T1}$. In this manner, the downlink signal is transmitted to the band pass filter 201 from the directional antenna 200, then to the input terminal of the power amplifier 210 through the receive and transmit switch 202, and down-converted to IF signals by the converter 230 after being amplified by the amplifier 210. The resulting IF signal is up-converted to RF signals by converter 234 after being amplified by the amplifier 231, filtered by the SAW filter 232, level-regulated by the variable gain regulator 211 and amplified by the amplifier 233. Next, the uplink signal reaches a predetermined level after being amplified by amplifier 212, and the amplified downlink signal is emitted to the predetermined area by the directional antenna 205 after being transmitted to the directional antenna 205 through the receive and transmit switch 203 and the band pass filter 204.

With regard to repeating the the uplink signals emitted from terminal devices:

When an uplink signal arrives in the directional antenna 205, the operation states of power amplifiers 210, 231, 233 and 212 and the variable gain regulator 211 have been set as the off state in advance some time by the synchronization extraction and control device 500. After a delay, the receive and transmit switch 203 switches to the input terminal of the power amplifier 220, and the receive and transmit switch 202 switches to the output of the power amplifier 222. After a further dealy, the states of the power amplifiers 220, 241, 243 and 222 and the variable gain regulator 221 are set as the on state. All these state conversions are finished in the guard time slot $G_{T0}$. In such a manner, the uplink signal is transmitted to the band pass filter 204 from the directional antenna 205, then to the input terminal of the power amplifier 220 through the receive and transmit switch 203, and down-converted to IF signals by the converter 240 after being amplified by the amplifier 220. The resulting IF signal is up-converted to RF signals by converter 244 after being amplified by the amplifier 241, filtered by the SAW filter 242, level-regulated by the variable gain regulator 221 and amplified by the amplifier 243. Next, the uplink signal reaches a predetermined level after being amplified by the amplifier 222, the amplified uplink signal is emitted to a base station receiving antenna by the directional antenna 200 after being transmitted to directional antenna 200 through the receive and transmit switch 202 and band pass filter 201.

Figure 5:
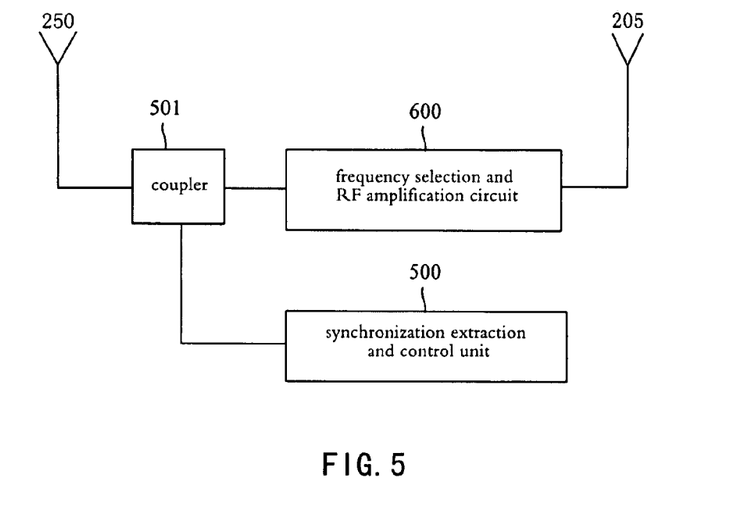
FIG. 5 is a sketch drawing showing the apparatus for repeating wireless signals bidirectionnally and synchronously according to a third embodiment of the present invention.

FIG. 5 shows the configuration of the apparatus for repeating wireless signals bidirecitonally and synchronously according to a third embodiment of the present invention, wherein the synchronization extraction and control device 500 is same as that in the first embodiment shown in FIG. 3, and the frequency selection and bidirection RF amplification circuit 600 can have the configuration of the frequency selection and bidirection RF amplification circuit 300 in the first embodiment shown in FIG. 3, or the frequency selection and bidirection RF amplification circuit 400 in the second embodiment shown in FIG. 4. The synchronization extraction and control device 500 and the frequency selection and bidirection RF amplification circuit 600 share a common antenna 250 and base station as an air-link. The downlink signals received by the antenna 250 and emitted from the base station are divided into two link signals by the coupler 501: one link signal is transmitted to the synchronization extraction and control device 500 and is used to extract the control system from the base station to obtain the control sequence for the frequency selection and bidirection RF amplification circuit 600, and further monitors the malfunction by controlling the frequency selection and bidirection RF amplification circuit 600 via the obtained control sequence; the other link signal is transmitted to the frequency selection and bidirection RF amplification circuit 600 and is used to amplify and repeat signals emitted from the base station so as to enhance the quality of signals emitted from the base station and expand the coverage area of signals emitted from the base station. For detail operation process, please be referred to the descriptions of the first embodiment shown in FIG. 3 and the second embodiment shown in FIG. 4.

For a better description, said antennas 200, 100 and 250 are also called the first, the second and the third receiving antenna for base station signals respectively, moreover, they can be give any names which won't affect the implementation of the present invention.

The active state PA_EN2 and PA_EN1 is indicated by a high level and the inactive state by a low level. In other embodiments of the present invention, other level states can also be used to indicate the active and inactive states respectively, which won't affect the implementation of the present invention.

Although the present invention is described by embodiments, it should be known by the skilled in the art that there are various modifications and changes without departing from the spirit of the invention, e.g., the frequency selection and bidirection RF amplification circuit can adopt one-stage or multiple-stage amplification according to the practical requirements. Moreover, the coupling modes of each component contain many forms and are not limited to several modes as mentioned above, and these modifications and changes are included in the appended claims without departing from the spirit of the invention.

What is claimed is:

1. A method for repeating wireless signals bidirectionally and synchronously, which is applied to a TDD wireless communication system comprising a base station and a terminal device, wherein said method comprises:

step A: obtaining synchronization information of said system from wireless signals emitted from said base station;

step B: generating reference control signals accurately synchronized with the base station according to the obtained system synchronization information and the system time slot configuration information;

step C: processing said reference control signals accurately synchronized with the base station respectively to generate a plurality of time sequential control signals to control the uplink RF amplification, the downlink RF amplification and the receiving and transmission respectively, thereby controlling the downlink channel to be closed when uplink channel is open and the uplink channel to be closed when the downlink channel is open, so as to repeat signals emitted from the uplink/downlink channel between said base station and terminal devices bidirectionally and synchronously; wherein said sequential control signals described in step C are obtained by logically converting and delaying said reference control signals accurately synchronized with the base station;

said logical conversion and delay indicate concretely:

delaying the downlink RF amplification control signals, the uplink RF amplification control signals, and the receive- and transmit control signals respectively, so that:

when switching from the downlink enable to the uplink enable, the downlink RF amplification control signal (PA_EN1) is firstly switched into an inactive state, then the receive and transmit control signal (SW) is switched to allow the uplink channel to be open, and finally the uplink RF amplification control signal (PA_EN2) is switched into an active state; and when switching from the uplink enable to the downlink enable, the uplink RF amplification control signal (PA_EN2) is firstly switched into an inactive state, then the receive and transmit control signal (SW) is switched to allow the downlink channel to be open, and finally the downlink RF amplification control signal (PA_EN1) is switched into active state.

2. The method as claimed in claim 1, wherein the generation of reference control signals accurately synchronized with the base station according to the system synchronization information described in step B comprises:

step B1: generating synchronization pulses and activating a timer when obtaining the system synchronization information;

step B2: the timer activated in step B1 beginning to time according to the system time slot configuration information and switching the uplink and downlink enable signals based on the timing of the timer, thereby generating reference control signals accurately synchronized with the base station.

3. The method as claimed in claim 1, wherein, between step B1 and B2, said method further comprises:

obtaining the adjustable timing for synchronization from the base station, and calculating the lag timing between the synchronization pulses generated in step B1 and the synchronization time slot including the synchronization information corresponding to this pulse.

4. The method as claimed in claim 3, wherein said timer times according to said lag timing, the total time of uplink/downlink time slots and the time of the guard time slots $G_{T0}/G_{T1}$ in the time slot configuration, and allows the accurate synchronous reference control signals to switch between the uplink and downlink enable signals after the last transmission data bit in the uplink/downlink time slot.

5. The method as claimed in claim 4, wherein the initial timing of said timer is: the total time of the uplink time slot +the time of the guard time slot $G_{T0}$−(the lag timing-the time of the synchronization time slot), a downlink enable signal being generated after the initial timing is carried out; the timer begins to time a downlink enable signal: the time of the guard time slot $G_{T1}$+the total time of the downlink time slot, the up link enable signal being generated after the timing is carried out; the timer begins to time an uplink enable signal: the time of the guard time slot $G_{T0}$+the total time of the uplink time slot, the downlink enable signal being generated again after the timing of the uplink enable signal is carried out; and the timer repeats the above operation to time the uplink and downlink enable signals, the uplink enable signals and downlink enable signals being generated repeatedly according to these timings, thereby generating said reference control signals accurately synchronized with the base station.

6. The method as claimed in claim 2, wherein, said method further comprises:

synchronizing said timer one time using said synchronization pulses after a predetermined period to eliminate the accumulated errors of the timer clock.

7. The method as claimed in claim 1, wherein said active state of the uplink and downlink RF amplification control signals are indicated by a high level, and said inactive state by a low level.

8. The method as claimed in claim 1, wherein, in step C, said control closing the downlink channel when the uplink channel is open performs as follows:

firstly, the downlink RF amplification control signal (PA_EN1) switched into inactive state allows the downlink of power amplification to be close, then the uplink channel is opened and the downlink channel is closed by the receive and transmit control signal (SW), and finally the uplink RF amplification control signal (PA_EN2) switched into active state enables the uplink of the power amplification; and said control closing the uplink channel when the downlink channel is open performs as the following: firstly, the uplink RF amplification control signal (PA_EN2) switched into inactive state allow the uplink of the power amplification to be closed, then the downlink channel is opened and the uplink channel is closed by the receive and transmit control signal (SW), and the finally downlink RF amplification control signal (PA_EN~1) which is switched into active state enables the downlink of power amplification.

9. An apparatus for repeating wireless signals bidirectionally and synchronously, wherein, said apparatus comprises a receiving antenna for base station signals, a receiving antenna for terminal device signals, a frequency selection and bidirection RF amplification circuit, and a synchronization extraction and control device, wherein, the synchronization extraction and control device receives wireless signals emitted from the base station by the receiving antenna for base station signals, generates sequential control signals by using these wireless signals and the system time slot configuration information, and transmits the sequential control signals to the frequency selection and bidirection RF amplification circuit; and the frequency selection and bidirection RF amplification circuit receives wireless signals emitted from the base station by the receiving antenna for base station signals, opens the downlink channel while closes the uplink channel, amplifies and filters these wireless signals according to the sequential control signals transmitted from the synchronization extraction and control device, then repeats the amplified wireless signals to terminal devices by the receiving antenna for terminal devices signals; receives wireless signals emitted from terminal devices by the receiving antenna for terminal device signals, opens the uplink channel while closing the downlink channel, amplifies and filters these wireless signals according to the sequential control signals transmitted from the synchronization extraction and control device, and then repeats the amplified wireless signals to the base station by the receiving antenna for base station signals; wherein said frequency selection and bidirection RF amplification circuit comprises; a first filter, a second filter, a first receive and transmit switch, a second receive and transmit switch, a power amplification device for uplink signals, and a power amplification device for downlink signals, said first and second receive and transmit switch being used for opening the uplink channel and closing the downlink channel or for opening the downlink channel and closing the uplink channel under the control of the sequential control signals, the power amplification device for uplink signals and the power amplification device for downlink signals being in on state and in off state respectively under the control of the sequential control signals when the uplink channel is opened, and the power amplification device for uplink signals and the power amplification device for downlink signals being in off state and in on state respectively under the control of the sequential control signals when the downlink channel is opened, wherein, for the uplink channel:

a wireless signal emitted from terminal devices and received by the receiving antenna for terminal device signals is filtered by the second filter, then transmitted to the power amplification device for downlink signals through the second receive and transmit switch and amplified, the amplified wireless signal is transmitted to the first filter through the first receive and transmit switch and filtered, next the amplified wireless signal after being filtered is transmitted from the first filter to the receiving antenna for base station signals and emitted to the base station by means of the receiving antenna for base station signals; and for the downlink channel:

a wireless signal emitted from the base station and received by the receiving antenna for base station signals is filtered by the first filter, then transmitted to the power amplification device for uplink signals through the first receive and transmit switch and amplified; the amplified wireless signal is transmitted to the second filter through the second receive and transmit switch and filtered; the second filter transmits the amplified wireless signal after being filtered to terminal devices by means of the receiving antenna for terminal device signals;

said downlink power amplification device comprises:

a first to fourth power amplifier, a first converter, a second converter, a first SAW filter, and a first variable gain regulator, wherein, a signal emitted from the base station is transmitted to the input terminal of the first power amplifier through the first receive and transmit switch, then amplified by the first power amplifier, and next down-converted to IF signals by the first converter; after being amplified by the second amplifier, IF filtered in the first SAW filter, level-regulated by the first variable gain regulator, amplified by the third amplifier, up-converted to RF signals by the second converter, and amplified by the fourth amplifier, the signal emitted from this base station reach a predetermined level and then transmitted through the second receive and transmit switch;

and said uplink power amplification device comprises:

a fifth to eighth power amplifier, a third converter, a fourth converter, a second SAW filter, and a second variable gain regulator, wherein a signal emitted from terminal devices is transmitted to the input terminal of the fifth power amplifier through the second receive and transmit switch, then amplified by this power amplifier, and next down-converted to IF signals by the third converter; after being amplified by the sixth amplifier, IF filtered in the second SAW filter, level-regulated by the second variable gain regulator, amplified by the seventh amplifier, up-converted to RF signals by the fourth converter, and amplified by the eighth amplifier, the signal emitted from the terminal devices reaches a predetermined level and then transmitted through the first receive and transmit switch.

10. The apparatus for repeating wireless signals bidirectionally and synchronously as claimed in claim 9, wherein said frequency selection and bidirection RF amplification circuit comprises:

a filter set for filtering wireless signals which are received and repeated by receive and transmit antennas and emitted from terminal devices and the base station so as to obtain RF signals in the desired band and eliminate interfering signals from out bands;

a receive and transmit switch set for controlling receiving and/or transmitting the obtained RF signals in the desired band;

a power amplification device for amplifying the obtained RF signals in the desired band to reach a power which is required when these signals are received and transmitted.

11. The apparatus as claimed in claim 10, wherein said power amplification device comprises a power amplifier and a variable gain regulator for regulating the output signal level of the power amplifier to control the amplification factor of amplification devices.

12. The apparatus as claimed in claim 11, wherein said variable gain regulator can be an adjustable attenuator or a variable gain amplifier.

13. The apparatus as claimed in claim 9, wherein said synchronization extraction and control device comprises:

a wireless transceiver for receiving wireless signals emitted from the base station and emitting wireless signals to the base station;

a synchronization extraction device for extracting the system synchronization information from wireless signals emitted from the base station; and a sequential control device for generating control sequence corresponding to signals emitted from the base station and terminal devices based on the system synchronization information to control the frequency selection and bidirection RF amplification circuit.

14. The apparatus as claimed in claim 13, wherein the sequential control device is further used to monitor the frequency selection and bidirection RF amplification circuit and emit malfunction monitor signals to the base station by means of the wireless transceiver.

15. The apparatus as claimed in claim 9, wherein said receiving antenna for base station signals comprises:

a first receiving antenna for base station signals, for receiving wireless signals emitted from the base station, transmitting these wireless signals to the frequency selection and bidirection RF amplification circuit and repeating wireless signals emitted from terminal devices to the base station;

a second receiving antenna for base station signals, for receiving wireless signals emitted from the base station and transmitting these wireless signals to the synchronization extraction and control device.

16. The apparatus as claimed in claim 9, wherein said receiving antenna for base station signals comprises:

a third receiving antenna for base station signals for receiving wireless signals emitted from the base station, and a coupler by which wireless signals are sent to the frequency selection and bidirection RF amplification circuit and the synchronization extraction and control device respectively.

17. The apparatus as claimed in claim 9, wherein the receiving antenna for base station signals and the receiving antenna for terminal devices signals form a receiving and transmitting antenna set.

\* \* \* \* \*